United States Patent [19]

Zhang et al.

[11] Patent Number: 5,576,118
[45] Date of Patent: Nov. 19, 1996

[54] MAGNESIUM BASED HYDROGEN STORAGE ALLOY ELECTRODE

[75] Inventors: Yunshi Zhang; Deying Song; Youxiao Chen; Jun Chen; Genshi Wang; Huatang Yuan; Zuoxiang Zhou; Xuejun Cao; Taoshi Zang; Daxin Zhang, all of TianJin, China

[73] Assignee: NanKai University, TianJin, China

[21] Appl. No.: 219,752

[22] Filed: Mar. 29, 1994

Related U.S. Application Data

[63] Continuation of Ser. No. 916,250, Jul. 17, 1992, abandoned.

[30] Foreign Application Priority Data

Jan. 8, 1992 [CN] China ................................ 92100030.8

[51] Int. Cl.$^6$ .............................. H01M 4/46; H01M 4/58
[52] U.S. Cl. ........................... 429/218; 420/402; 420/900; 429/223
[58] Field of Search ................................ 429/218, 40, 59, 429/223; 420/402, 407, 900; 252/182.1

[56] References Cited

U.S. PATENT DOCUMENTS

| | | | |
|---|---|---|---|
| 2,204,567 | 6/1940 | Burkhardt et al. | 420/407 |
| 4,728,586 | 3/1988 | Venkatesan et al. | 429/209 |
| 5,008,164 | 4/1991 | Furukawa et al. | 429/218 |

*Primary Examiner*—Anthony Skapars
*Attorney, Agent, or Firm*—Pennie & Edmonds

[57] ABSTRACT

This invention relates to a hydrogen storage alloy electrode prepared from an active material comprising a magnesium based alloy and a Ni, P based metallic compound. The magnesium based alloy is coated while in powder form with a Ni, P based metallic compound and activated by heat. The hydrogen storage alloy electrode produced from this active material is able to absorb and desorb hydrogen even under normal temperature and pressure. The alkali battery assembled with the electrode prepared from the activated alloy material has high energy density and charge-discharge capacity and can be used in large scale electrical equipment, especially electrically operated vehicles.

12 Claims, No Drawings

5,576,118

MAGNESIUM BASED HYDROGEN STORAGE ALLOY ELECTRODE

This is a continuation of application Ser. No. 07/916,250, filed Jul. 17, 1992, now abandoned.

BACKGROUND OF THE INVENTION

This invention relates to a hydrogen storage alloy electrode, in particular to a magnesium alloy based active material.

It is well know in the art that there are many kinds of hydrogen storage alloy active materials, such as rare earth system ($LaNi_5$ etc), titanium system (TiNi etc), zirconium system ($ZrMn_2$ etc), calcium system (CaNi etc), and magnesium system ($Mg_2Ni$ etc). The rare earth system and titanium system are studied the most and applied to alkali batteries (concentrating mainly on the sealed cylindrical batteries used for the electricity supply of portable equipment). The next most studied systems are zirconium system and calcium system. Few reports of the magnesium system can be found.

Nevertheless, further requirements are proposed for the performances of alkali batteries for today's large scale electrical equipment, especially electrically operated vehicles, wherein one of the main technical indexes is high energy density. Because the weights of the elements present in alloys of rare earth system and titanium system are heavy, improvement of the energy density of alkali batteries assembled with electrodes prepared from these materials is limited. Furthermore the cost of the alloys of rare earth system and titanium system is expensive, so that their application to alkali batteries for large scale electrical equipment is also limited. The most ideal hydrogen storage alloy applied in this respect is the magnesium system alloy. However, hydrogen is relatively stable in the magnesium base, and can only be absorbed under high pressure and desorbed at high temperature. The magnesium based alloy developed at present can only absorb hydrogen under 3~10 atm pressure and desorb hydrogen at 300° C. temperature. See Seiler, S. et al., in J. Less—Common Met. 73, 193 (1980). This magnesium based alloy, however cannot be applied under normal conditions.

SUMMARY OF THE INVENTION

A primary object of the present invention is to provide an active material of magnesium based alloy which can absorb and desorb hydrogen sufficiently under normal pressure and temperature.

Another object of the present invention is to provide a magnesium based hydrogen storage alloy electrode which can absorb and desorb hydrogen efficiently under normal conditions.

A further object of the present invention is to provide an alkali battery with high energy density.

According to the present invention, a hydrogen storage alloy electrode has an active material which comprises a magnesium based hydrogen storage alloy and a Ni, P based metallic compound. The magnesium based alloy in a powder form is coated with the Ni, P based metallic compound. The coated magnesium base alloy is activated by heat.

DETAILED DESCRIPTION OF THE INVENTION

In accordance with the invention, a magnesium based hydrogen storage alloy electrode includes an active material which comprises a magnesium based alloy and a Ni, P based metallic compound. The magnesium based alloy powder is coated with the Ni, P based metallic compound. The coated alloy powder is then treated by heat.

In a suitable embodiment of the magnesium based hydrogen storage alloy electrode in accordance with the invention, the magnesium based alloy has the compositional formula $Mg_{2-x} Ni_{1-y} A_y B_x$, wherein x is between 0.1 and 1.5, y is between 0.1 and 0.5, A is at least an element selected from Sn, Sb or Bi, B is at least an element selected from Li, Na, K and Al. Preferably, A is Sn and B is Al.

A nickel, phosphorous based metallic compound according to the invention is a Ni, P, D metallic compound in which D is an element selected from Cr, W, Co or Sn. The atomic percentage of the metallic compound for Ni is: 90 to 97%, for P: 1 to 7% and for D: 0 to 5%, based on total atoms of the metallic compound.

It is preferred according to the invention that the nickel, phosphorous based metallic compound is a Ni, P metallic compound in which the atomic percentage of Ni is from 93 to 97%, P is from 3 to 7%.

In accordance with the invention, the magnesium based alloy of the formula $Mg_{2-x} Ni_{1-y} A_y B_x$ is pulverized to form alloy powder before the alloy is coated with the Ni, P based metallic compound. The size of the alloy powder is from about 250 to 600 mesh, preferably about 300 to 400 mesh. The coating of the Ni, P based metallic compound is formed on the surface of the alloy powder by chemical plating. The thickness of the coating of the metallic compound is from about 1 to 10μ according to the invention. The chemical plating is a conventional method. Before the magnesium based alloy powder is treated by chemical plating, the alloy powder is immersed for a short period of time, for instance minutes or more in an alkyl compound such as, dodecyl sodium sulfonate etc. The coated alloy powder is activated by heat, usually in a vacuum furnace at a temperature from 60° to 100° C. for 10 to 20 hrs.

It is believed that a new alloy phase is formed between the magnesium based alloy and the coating of the Ni, P based metallic compound after activation treatment. It is also believed that the new alloy phase has a different compositional structure than either the magnesium based alloy or the metallic compound, which makes it possible that the active material made according to the invention may absorb and desorb hydrogen at normal temperature and pressure.

In accordance with the invention, an alkali battery includes a hydrogen storage alloy electrode which incorporates the active material of the invention.

The magnesium based hydrogen storage alloy electrode is prepared from the encapsulated and activated magnesium based alloy powder according to the general technical process of electrode preparation. The alkali battery assembled with this magnesium based alloy electrode is not only possessed of high energy density and charge-discharge capacity, but is also inexpensive, so that it can be applied extensively to large scale electrical equipment, especially electrically operated vehicles.

EXAMPLE 1

A magnesium based alloy with its chemical composition of $Mg_{1.5} Ni_{0.7} Sn_{0.3} Al_{0.5}$ was prepared in a vacuum induction furnace. The alloy was crushed to particles of Φ 6 mm with a crusher. The particles were pulverized to powders of 300–400 mesh by a vibrational mill. Three hundred grams of the powder of the alloy was immersed in 60 g of methylbezene for 4 minutes. The powder was then coated with Ni, P metallic compound in a plating solution at 80° C. by a chemical plating method. The plating solution used in the method contained 180 g of $NiCl_2$, 250 g of $Na_2PO_2$, 200 g of trisodium citrate, 200 g of $NH_4Cl$, 200 ml ammonia and 5000 ml pure water. The coating of Ni, P metallic compound on the surface of the alloy powder is 3–4 μm. The coated powder was treated in a vacuum furnace at 80° C. for 10 hrs. The powder was then made up with the 7% of PTFE solution to form a paste. The paste was rolled at 60° C. to give an alloy.

What is claimed is

1. An active material of a hydrogen storage alloy electrode comprising a magnesium alloy and a metallic compound comprising nickel and phosphorus;

wherein the magnesium alloy has the compositional formula $Mg_{2-x} Ni_{1-y} A_y B_x$, wherein x is between 0.1–1.5, y is between 0.1–0.5, A is an element selected from the group consisting of Sn, Sb, and Bi, and B is an element selected from the group consisting of Li, Na, K and Al; and wherein the atomic percentages of the metallic compound is from about 90 to 97% of nickel and from about 1 to 7% of phosphorus.

2. The active material of claim 1 wherein the atomic percentage of the metallic compound is from 93 to 97% of nickel, and from about 3 to 7% of phosphorus.

3. The active material of claim 1, wherein A is Sn and B is Al.

4. A hydrogen storage alloy electrode comprising the active material of claim 1.

5. The active material of claim 1, wherein the metallic compound further comprises an element D which is selected from the group consisting of Cr, W, Co, and Sn, in an amount of about 0 to 5%.

6. The active material of claim 3, wherein the metallic compound further comprises an element D which is selected from the group consisting of Cr, W, Co, and Sn, in an amount of about 0 to 5%.

7. A hydrogen storage alloy electrode comprising the active material of claim 2.

8. A hydrogen storage alloy electrode comprising the active material of claim 3.

9. A hydrogen storage alloy electrode comprising the active material of claim 5.

10. A composition which can absorb and desorb hydrogen comprising a magnesium alloy and metallic compound comprising nickel, phosphorus and element D which is selected from the group consisting of chromium, tungsten, cobalt and tin;

wherein the magnesium alloy is of the formula $Mg_{2-x} Ni_{1-y} A_y B_x$, in which x is between 0.1–1.5, y is between 0.1–0.5, A is an element selected from the group consisting of Sn, Sb, and Bi, and B is an element selected from the group consisting of Li, Na, K and Al; and wherein the atomic percentages of the metallic compound is from about 90 to 97% of nickel, from about 1 to 7% of phosphorus, and from about 0 to 5% of element D.

11. The composition of claim 10, wherein A is tin, B is aluminum.

12. The composition of claim 10, wherein the atomic percentages of the metallic compound is from about 93 to 97% of nickel and from about 3 to 7% of phosphorus.

* * * * *